(12) United States Patent
Jeon et al.

(10) Patent No.: US 6,819,645 B2
(45) Date of Patent: Nov. 16, 2004

(54) RECORDING MEDIUM WITH WOBBLE-MODULATED TRACK, AND METHOD OF AND APPARATUS FOR DETECTING HEADER REGION OF THE SAME

(75) Inventors: Jin-hoon Jeon, Suwon-si (KR); Jung-wan Ko, Yongin-si (KR); Tatsuhiro Otsuka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 09/854,902

(22) Filed: May 15, 2001

(65) Prior Publication Data

US 2002/0067678 A1 Jun. 6, 2002

(30) Foreign Application Priority Data

Dec. 4, 2000 (KR) ......................................... 2000-72939

(51) Int. Cl.[7] ................................................. G11B 7/00
(52) U.S. Cl. ............................... 369/59.25; 369/124.04; 369/275.3; 369/275.4
(58) Field of Search ........................... 369/275.3, 275.4, 369/44.26, 47.18, 47.19, 47.21, 47.22, 47.27, 47.31, 59.2, 59.22, 59.23, 59.25, 124.07, 124.04, 124.08

(56) References Cited

U.S. PATENT DOCUMENTS

| | | | | |
|---|---|---|---|---|
| 6,266,318 B1 | * | 7/2001 | Honda et al. | 369/275.4 |
| 6,587,423 B2 | * | 7/2003 | Van Den Enden | 369/275.1 |
| 6,671,238 B1 | * | 12/2003 | Ko et al. | 369/44.13 |

* cited by examiner

Primary Examiner—Thang V. Tran
(74) Attorney, Agent, or Firm—Staas & Halsey LLP

(57) ABSTRACT

A recording medium with a wobble-modulated track, and a method of and an apparatus for detecting a header region of the same. The recording medium includes a wobbled track on which a wobble signal is recorded, a header region on which header information is recorded, and a wobble-modulated track on which a wobble modulation signal obtained by modulating the wobble signal is recorded. Accordingly, the header region is reliably detected, and the reliability of header information read is increased.

36 Claims, 8 Drawing Sheets

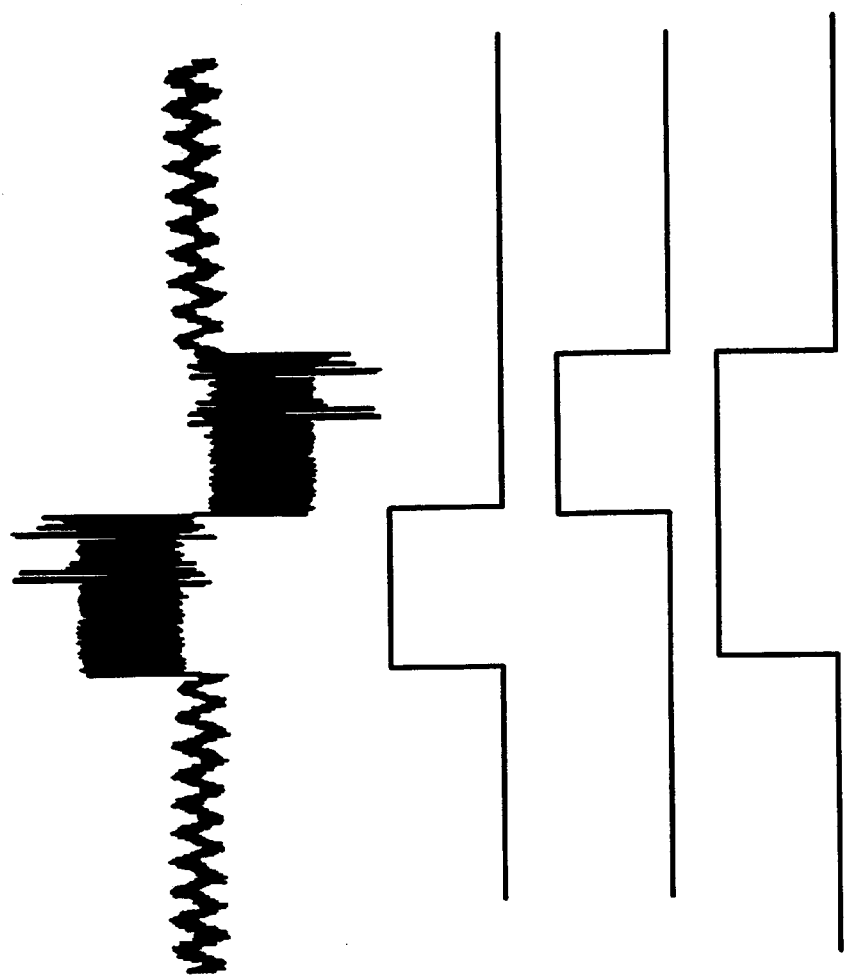
FIG. 2A (PRIOR ART) CHANNEL 2 SIGNAL
FIG. 2B (PRIOR ART) CHANNEL 2 UPPER SLICED SIGNAL
FIG. 2C (PRIOR ART) CHANNEL 2 LOWER SLICED SIGNAL
FIG. 2D (PRIOR ART) HEADER DETECTION SIGNAL

AUTOCORRELATION CHARACTERISTIC

CORRELATOR FREQUENCY CHARACTERISTIC

US 6,819,645 B2

RECORDING MEDIUM WITH WOBBLE-MODULATED TRACK, AND METHOD OF AND APPARATUS FOR DETECTING HEADER REGION OF THE SAME

CROSS REFERENCE TO RELATED APPLICATIONS

This application claims the benefit of Korean Application No. 2000-72939 filed Dec. 4, 2000, in the Korean Patent Office, the disclosure of which is incorporated herein by reference.

BACKGROUND OF THE INVENTION

1. Field of the Invention

The present invention relates to a recording medium including a header region on which header information is recorded, and a method of and an apparatus for detecting the header region, and more particularly, to a recording medium including a wobbled track on which user data is recorded and a header region on which header information is recorded, and a method of and an apparatus for detecting the header region.

2. Description of the Related Art

A groove is formed along each track on an optical disc such as a digital versatile disc-random access memory (DVD-RAM) to allow a recording laser beam to exactly follow the track. Land corresponding to the surface of a substrate exists between grooves. Data is recorded on a groove track and/or a land track. A track is divided into a plurality of sectors and managed.

A wobble signal of a specified frequency is recorded on a groove track and/or a land track on an optical disc through a change in direction of an amplitude. The wobble signal is used for recording an auxiliary clock signal for obtaining synchronizing information during recording or reproduction. In other words, the wobble signal has a frequency band which does not influence a tracking servo mechanism provided in a recording/reproducing apparatus and is used as an auxiliary signal supplementing a system clock. According to DVD-RAM specifications, a servo band for tracking in a radial direction is about 10 KHz, and the frequency of the wobble signal is about 157 KHz at a standard linear velocity.

A header region is disposed on a track to record header information of each sector thereon. According to the DVD-RAM specifications, the header region is formed of pre-pits when a substrate is manufactured. The header region comprises a variable frequency oscillator (VFO) region for phase locked loop (PLL), a physical identification data (PID) region assigned a sector number and an identification (ID) error detection (IED) region which stores ID error detection information. A header region is disposed at a predetermined portion of a sector. A pickup device provided in a recording/reproducing apparatus searches for and moves to a desired position based on information recorded on a header region. The pickup device recognizes a sector number, a sector type and a land track or a groove track and performs servo control, using the information recorded on the header region.

FIG. 1 is a schematic diagram illustrating a conventional wobbled track. Referring to FIG. 1, on an optical disc having a conventional wobbled track, a header region on which header information is recorded is provided at a boundary between a sector N-1 and a sector N. According to the DVD-RAM specifications, the two portions of the header region are displaced from a track center to the right and to the left, respectively, by a ½ track at the beginning of the sector N.

FIGS. 2A–2D are diagrams for explaining a method of detecting the header region of FIG. 1. Referring to FIG. 2A, in a channel 2 signal detected through a channel 2, a wobble signal having a specified frequency constantly appears in a wobbled region. However, a rapid signal change occurs in the header region because a high frequency signal for header information is recorded on the header region. Accordingly, as shown in FIG. 2A, the channel 2 signal is amplified and then low-pass filtered. Thereafter, the channel 2 signal is sliced on the basis of a predetermined reference slice level, thereby obtaining an upper sliced signal and a lower sliced signal as shown in FIGS. 2B and 2C, respectively. An OR operation is performed on the upper sliced signal and the lower sliced signal, thereby obtaining a header detection signal as shown in FIG. 2D. A region corresponding to a portion of a high level in the header detection signal is the header region.

Reliable detection of a header region is essential to control of rotation of an optical disc and is necessarily required to exactly read various information recorded on a header region. This is particularly essential to an optical disc as a recording medium with a high precision. However, as described in FIG. 1, the header region is continuously disposed between the sector N-1 and the sector N so that it becomes a gap in a wobble signal. Such a gap affects detection of the channel 2 signal as external disturbance, so that it is difficult to exactly detect the start position of the header region.

SUMMARY OF THE INVENTION

To solve the above problem, it is an object of the present invention to provide a recording medium with a wobbled track, from which a header region may be more reliably detected, and a method of and an apparatus for detecting the header region.

Additional objects and advantages of the invention will be set forth in part in the description which follows, and, in part, will be obvious from the description, or may be learned by practice of the invention.

Accordingly, to achieve the above and other objects of the invention, one aspect of the invention provides a recording medium comprising a wobbled track on which a wobble signal is recorded, a header region on which header information is recorded, and a wobble-modulated track on which a wobble modulation signal, obtained by modulating the wobble signal, is recorded.

The wobble modulation signal may be a wobble signal after having been phase modulated or a binary data of a predetermined length after having been subjected to binary phase shift keying (BPSK), where an autocorrelation R(τ) of the wobble modulation signal has a maximum value where τ=0 and is substantially 0 where τ≠0. The wobble modulation signal may be a signal having a white noise characteristic and a pseudo random (PR) sequence. Where the wobble modulation signal is processed by a finite impulse response (FIR) filter, where the equation describing the filtering characteristics of the FIR filter has the values of the bits of the wobble modulation signal as its coefficients, the frequency characteristic of the wobble modulation signal is substantially 0 in a DC area. The header region is positioned at the boundary region between sectors and comprises a plurality of portions displaced from the center of the wobbled track. The header information is recorded in the form of pre-pits, which are formed along the center of the wobbled track.

In another aspect, there is provided a method of detecting a header region from a recording medium including a wobbled track on which a wobble signal is recorded and the header region on which header information is recorded. The method comprises: detecting a wobble modulation signal from a wobble-modulated region on which the wobble modulation signal is recorded; demodulating the detected wobble modulation signal; outputting a header indicator signal based on an autocorrelation of the demodulated wobble modulation signal; and detecting the header region based on the header indicator signal.

The header region is positioned at the boundary region between sectors, and the wobble-modulated region is formed between the wobbled track and the header region. The wobble modulation signal, which is the wobble signal after having been phase modulated, is binary data of a predetermined length after having been subjected to binary phase shift keying (BPSK) and is a pseudo random (PR) signal. An autocorrelation $R(\tau)$ of the wobble modulation signal has a maximum value where $\tau=0$ and is substantially 0 where $\tau \neq 0$. The autocorrelation function $R(\tau)$ provides a measure of how closely the signal matches a copy of the signal as the copy is shifted $\tau$ units in time. The frequency characteristic of a finite impulse response (FIR) filter, the equation describing the filtering characteristics of which has the values of the bits of a wobble modulation signal as its coefficients, is substantially 0 in a DC area. In the demodulating of the detected wobble modulation signal, the wobble modulation signal is demodulated based on a clock signal which is generated based on the wobble modulation signal. The outputting of the header indicator signal comprises: multiplying each node value, which is obtained by sequentially delaying binary data as a wobble modulation signal, by a corresponding bit of the binary data; and adding the multiplied node values.

In still another aspect, there is provided an apparatus for detecting a header region from a recording medium including a wobbled track on which a wobble signal is recorded and the header region on which header information is recorded. The apparatus for detecting a header region comprises: a clock signal generator which receives a wobble modulation signal which is detected from a wobble-modulated region and outputs a clock signal, a demodulator which receives and demodulates the wobble modulation signal based on the clock signal output from the clock signal generator, and a correlator which performs an autocorrelation on the demodulated wobble modulation signal from the demodulator and outputs a header indicator signal based on the result of the autocorrelation.

The wobble-modulated region is formed between the wobbled track and the header region, and the header region is positioned at the boundary region between sectors. The wobble modulation signal, which is the wobble signal after having been phase modulated, is binary data of a predetermined length after having been subjected to binary phase shift keying (BPSK) and is a pseudo random (PR) signal. An autocorrelation $R(\tau)$ of the wobble modulation signal has a maximum value where $\tau=0$ and is substantially 0 where $\tau \neq 0$. The correlator comprises: a finite impulse response (FIR) filter which multiples node values, which are obtained by sequentially delaying the wobble modulation signal, by corresponding bits of the wobble modulation signal, respectively, and adds all values obtained from the multiplications; and a header reader which compares the level of a signal output from the FIR filter with a predetermined reference level and outputs the header indicator signal for detecting the header region. The FIR filter comprises a delay unit which receives and sequentially delays the modulated wobble modulation signal, a multiplier which multiplies each delayed signal from the delay unit by a corresponding bit of the demodulated wobble modulation signal, and an adder which adds all the outputs of the multiplier. The frequency characteristic of the FIR filter with respect to the wobble modulation signal input thereto is substantially 0 in a DC area.

BRIEF DESCRIPTION OF THE DRAWINGS

The above object and advantages of the present invention will become more apparent by describing in detail preferred embodiments thereof with reference to the attached drawings in which:

FIGS. 2A–2D are diagrams for explaining a conventional method of detecting the header region of FIG. 1;

DESCRIPTION OF THE PREFERRED EMBODIMENTS

Figure 1:
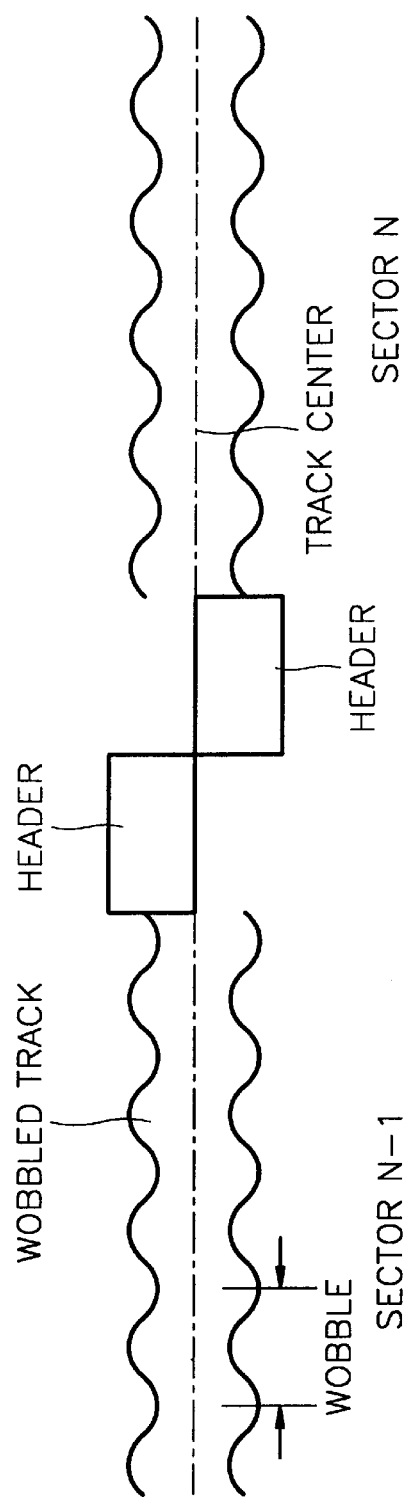
FIG. 1 is a schematic diagram illustrating a conventional wobbled track.

Reference will now be made in detail to the present embodiments of the present invention, examples of which are illustrated in the accompanying drawings, wherein like reference numerals refer to like elements throughout.

Figure 3:
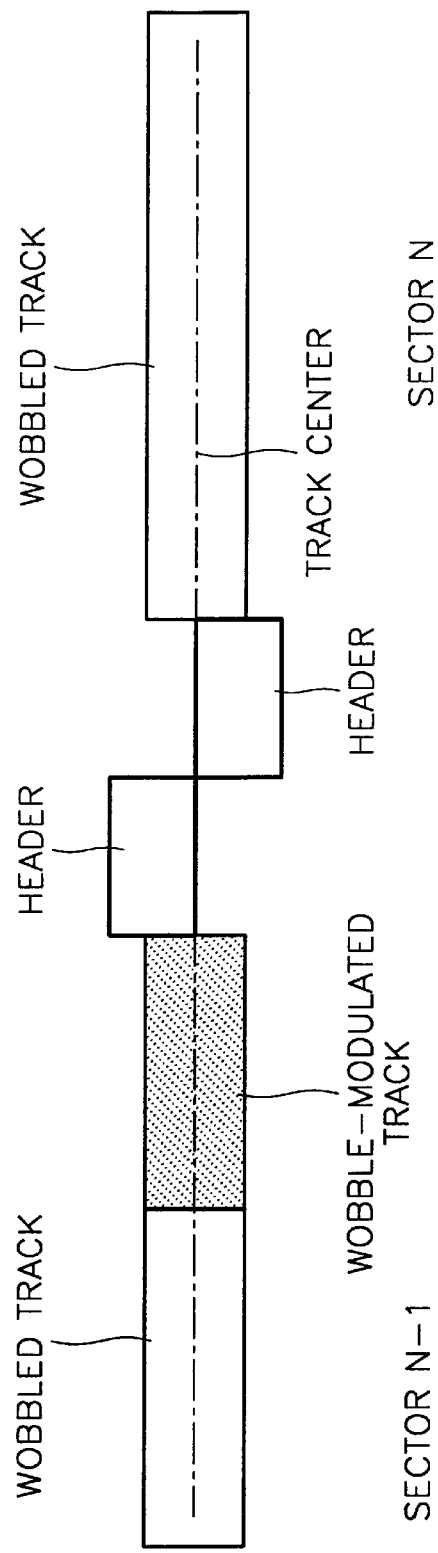
FIG. 3 is a schematic diagram illustrating a wobbled track according to an embodiment of the present invention.

Referring to FIG. 3, a wobble-modulated track, on which a phase modulated wobble signal is recorded, is formed between a wobbled track and a header region on an optical recording medium. A wobble modulation signal is L-bit binary data which results from binary phase shift keying (BPSK) modulation. Here, the number of bits of the wobble modulation signal and a modulation method is changed as necessary to accommodate a specific recording medium.

Figure 4:
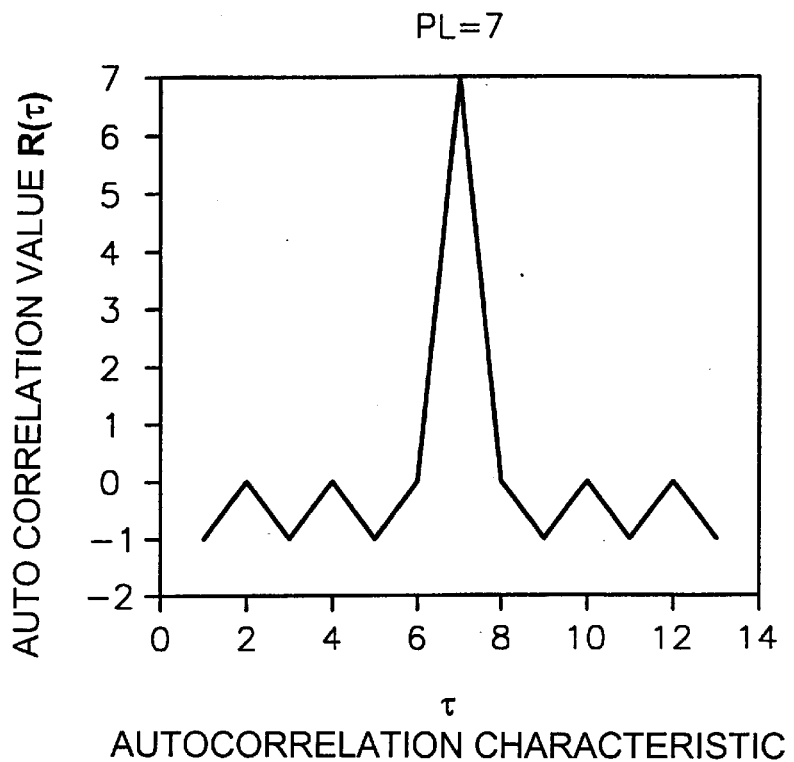
FIG. 4 is a graph showing an autocorrelation characteristic where a pattern length of a wobble modulation signal is 7 bits.
Figure 5:
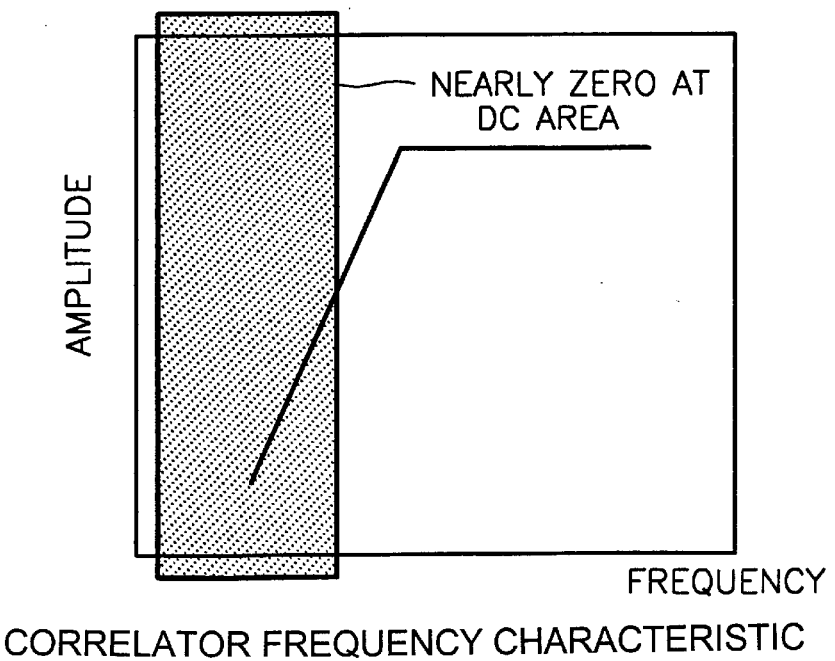
FIG. 5 is a graph showing amplitude versus frequency of a wobble modulation signal.

FIGS. 4 and 5 are diagrams for explaining the characteristics of a wobble modulation signal recorded on the wobble-modulated track of FIG. 3. FIG. 4 shows the characteristic of an autocorrelation $R(\tau)$ where the pattern length (PL) of a wobble modulation signal is 7 bits. The autocorrelation $R(\tau)$ of a wobble modulation signal has a maximum PL where $\tau=0$ and has a value close to zero where $\tau$ has a value other than zero. In other words, a wobble modulation signal as a phase-modulated signal has a white noise characteristic and the characteristic of a pseudo random (PR) sequence. Accordingly, the detection characteristic of a wobble modulation signal is enhanced.

Referring to FIG. 5, the frequency characteristic of a correlator having a wobble modulation signal as an input is illustrated. Where a wobble modulation signal is a low frequency band signal, that is, where a wobble modulation signal is in a DC area, the wobble modulation signal has an amplitude close to zero. Where a wobble modulation signal is a high frequency signal, the wobble modulation signal has a nonzero amplitude. In other words, where the equation describing the filtering characteristics of a finite impulse response (FIR) filter has the values of the bits of a wobble modulation signal as its coefficients, a frequency characteristic of the finite impulse response (FIR) filter, with respect to the wobble modulation signal, is that an output level with respect to a DC component is nearly zero. The FIR filter will be described in detail below.

In addition, a wobble modulation signal has the characteristic of a PR sequence and uniformly has bits 1 and 0 so that the number of bits 1 is similar to the number of bits 0. The reason for such a wobble modulation signal is as follows. A wobble signal recorded on a wobbled track and a wobble modulation signal recorded on a wobble-modulated track sequentially pass through a correlator. Here, an output value of the correlator with respect to the wobble signal is substantially 0, as described above. Accordingly, the difference between an output value of the correlator with respect to the wobble signal and an output value of the correlator with respect to the wobble modulation signal should be large so that the wobble modulation signal is easily discriminated from the wobble signal.

Figure 6:
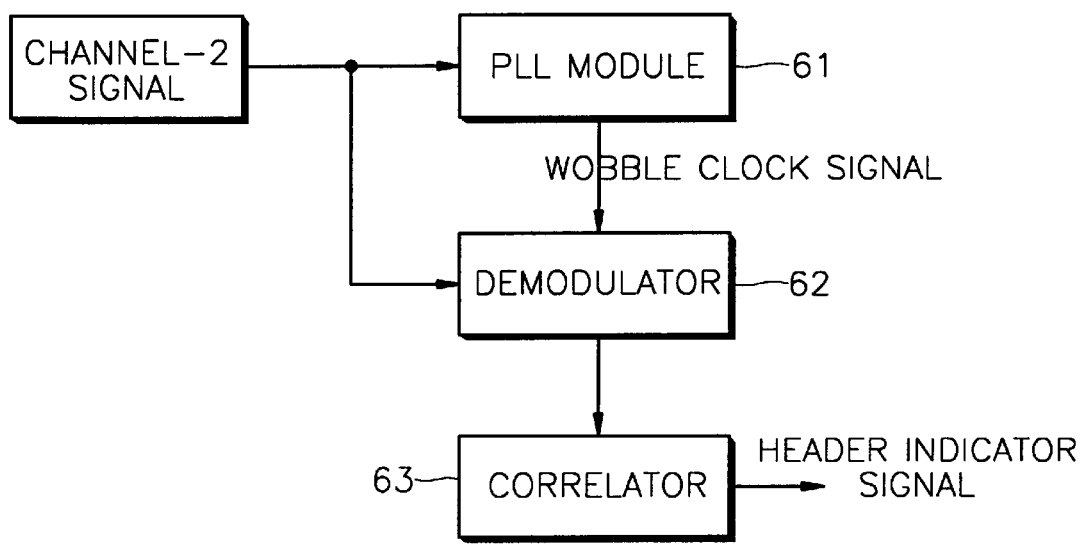
FIG. 6 is a block diagram illustrating an apparatus for detecting a header region according to an embodiment of the present invention.

FIG. 6 is a block diagram illustrating an apparatus for detecting a header region according to an embodiment of the present invention. Before describing the detection apparatus, a channel-2 signal will be described first. A pickup device (not shown) reads a signal from a wobbled track or a wobble-modulated track and outputs a channel-1 signal and a channel-2 signal. The pickup device comprises a 2-division or 4-division photo diode (PD). The channel-1 signal is the sum signal of signals detected from the individual divided regions of the PD. The channel-2 signal is the difference signal of the signals detected from the individual divided regions of the PD. For example, in the case of a 4-division PD, where it is assumed that divided regions sequentially arranged counterclockwise are referred to as A, B, C and D, and a direction from B to C is the radial direction of an optical disc, the channel-1 signal is A+B+C+D, and the channel-2 signal is (A+B)−(C+D).

Referring to FIG. 6, the apparatus for detecting a header area comprises a phase locked loop (PLL) module 61 as a clock signal generator which receives a channel-2 signal and generates a clock signal of a frequency corresponding to the channel-2 signal, a demodulator 62 which demodulates the channel-2 signal based on the clock signal from the PLL module 61 and a correlator 63 which auto-correlates the demodulated signal to output a header indicator signal.

The PLL module 61 recovers a wobble clock signal based on a detected wobble signal and a detected wobble modulation signal. Here, since a wobble modulation signal is a binary phase shift keying (BPSK) modulated signal, which is considered as one format of an unmodulated wobble signal or a wobble modulation signal, the PLL module 61 performs a phase-locking operation on the BPSK modulated signal. The demodulator 62 demodulates a wobble modulation signal based on the recovered wobble clock signal. The correlator 63 performs autocorrelation R(τ) on the demodulated signal.

Figure 7:
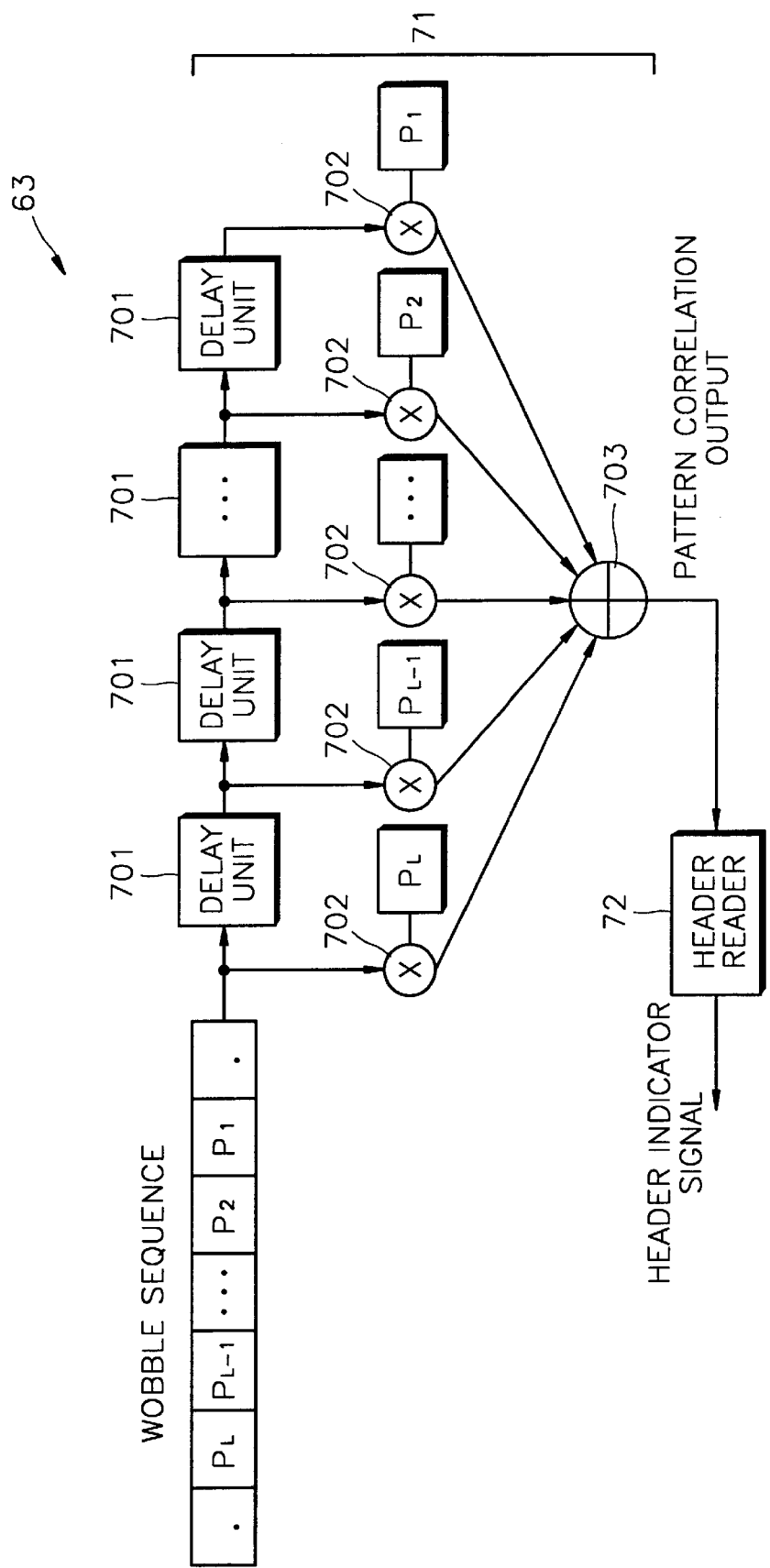
FIG. 7 is a detailed block diagram of the correlator of FIG. 6.

FIG. 7 is a detailed block diagram of the correlator 63 of FIG. 6. Referring to FIG. 7, the correlator 63 has a finite impulse response (FIR) filter structure. The equation describing the filtering characteristics of the FIR filter has the values of the bits of a wobble modulation signal as its coefficients. More specifically, the correlator 63 comprises an FIR filter 71 which sums all values obtained by multiplying the values of individual nodes, which are obtained by sequentially delaying the binary data of the demodulated signal, by the sequential bits of the binary data, respectively, and a header reader 72 which outputs a header indicator signal for detecting a header region, based on the level of a signal output from the FIR filter 71.

The FIR filter 71 comprises delay units 701 for delaying a wobble sequence which is the result of demodulating a wobble modulation signal, multipliers 702 for multiplying the input wobble sequence and delayed wobble sequences output from the delay units 701 by corresponding coefficients, respectively, and an adder 703 for adding the outputs of the multipliers 702. The adder 703 performs addition on L bits and is realized by properly using a carry-chain. The header reader 72 compares the level of a signal output from the adder 703 with a predetermined reference level and outputs a header indicator signal.

Figure 8:
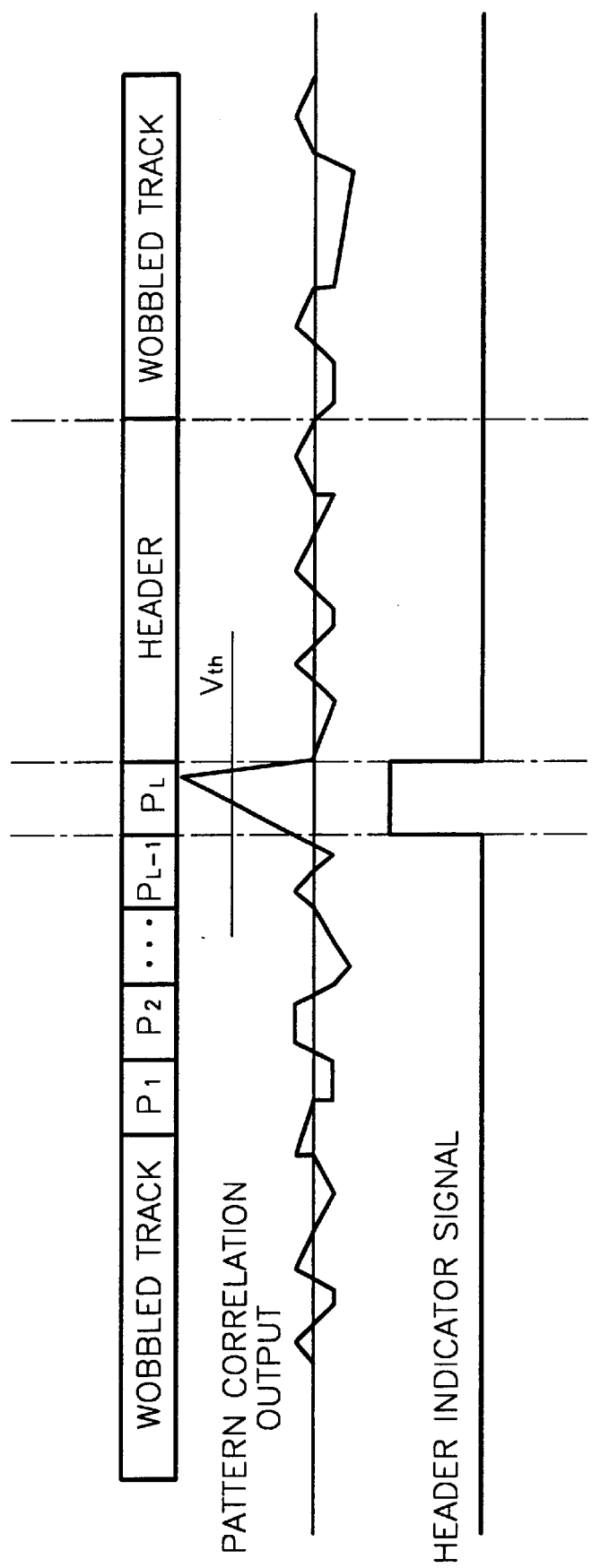
FIG. 8 is a timing diagram illustrating a header indicator signal output from the correlator of FIG. 7.

FIG. 8 is a timing diagram illustrating a header indicator signal output from the correlator 63 of FIG. 7. Referring to FIG. 8, a modulated wobble sequence of $P_1, P_2, \ldots, P_{L-1}$ and $P_L$ is recorded on a wobble-modulated track between a header region and a wobbled track. An autocorrelation R(τ) at $P_L$ has a maximum value larger than a threshold level $V_{th}$. The header indicator signal has an impulse at an interval corresponding to $P_L$ so that $P_L$, at which a correlation output is maximum, is detected. A reproducing apparatus can previously recognize the start point of a header region based on such a header indicator signal. As a result, a PLL operation for a high frequency signal detected from a header region is more reliably performed, and the reliability of header information read is increased.

Figure 9:
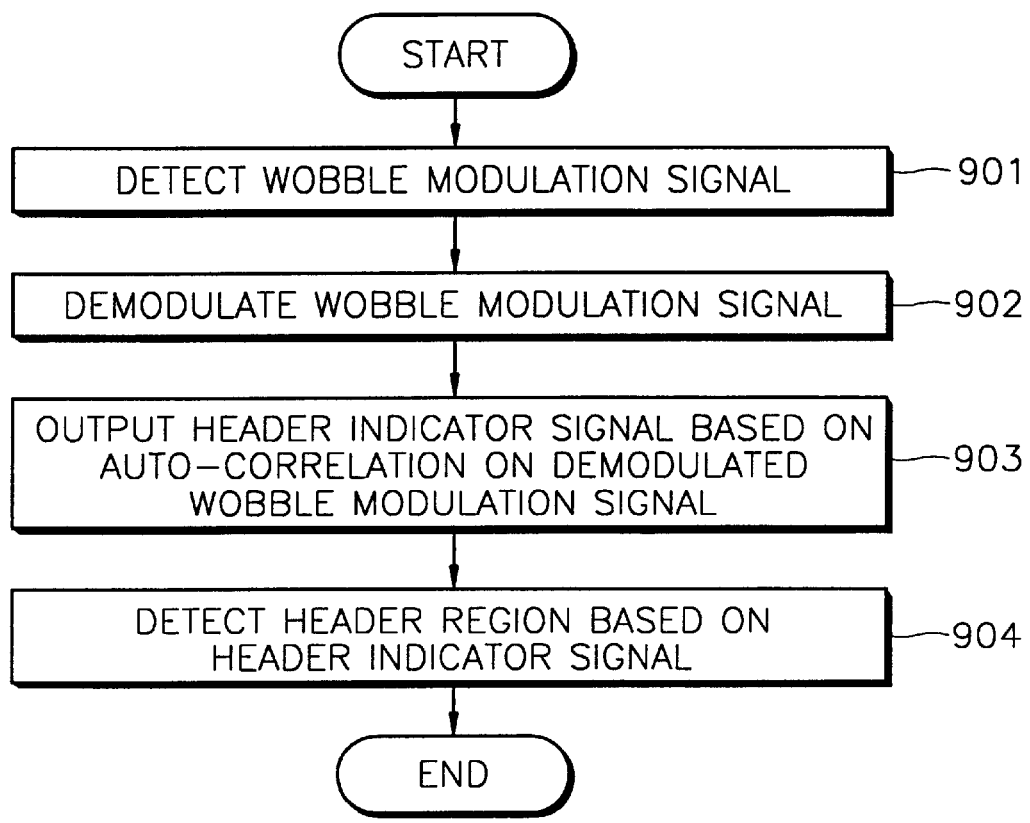
FIG. 9 is a schematic flowchart illustrating a method of detecting a header region according to an embodiment of the present invention.

The following description concerns a method of detecting a header region according to the present invention in a configuration as described above. FIG. 9 is a schematic flowchart illustrating a method of detecting a header region according to the present invention.

Referring to FIG. 9, a pickup device (not shown) of a detection apparatus detects a wobble modulation signal at 901 from a wobble-modulated region on a recording medium. The demodulator 62 demodulates the detected wobble modulation signal at 902. The correlator 63 outputs a header indicator signal based on an autocorrelation with respect to the demodulated wobble modulation signal at 903. The detection apparatus detects a header region based on the header indicator signal at 904.

Figure 10:
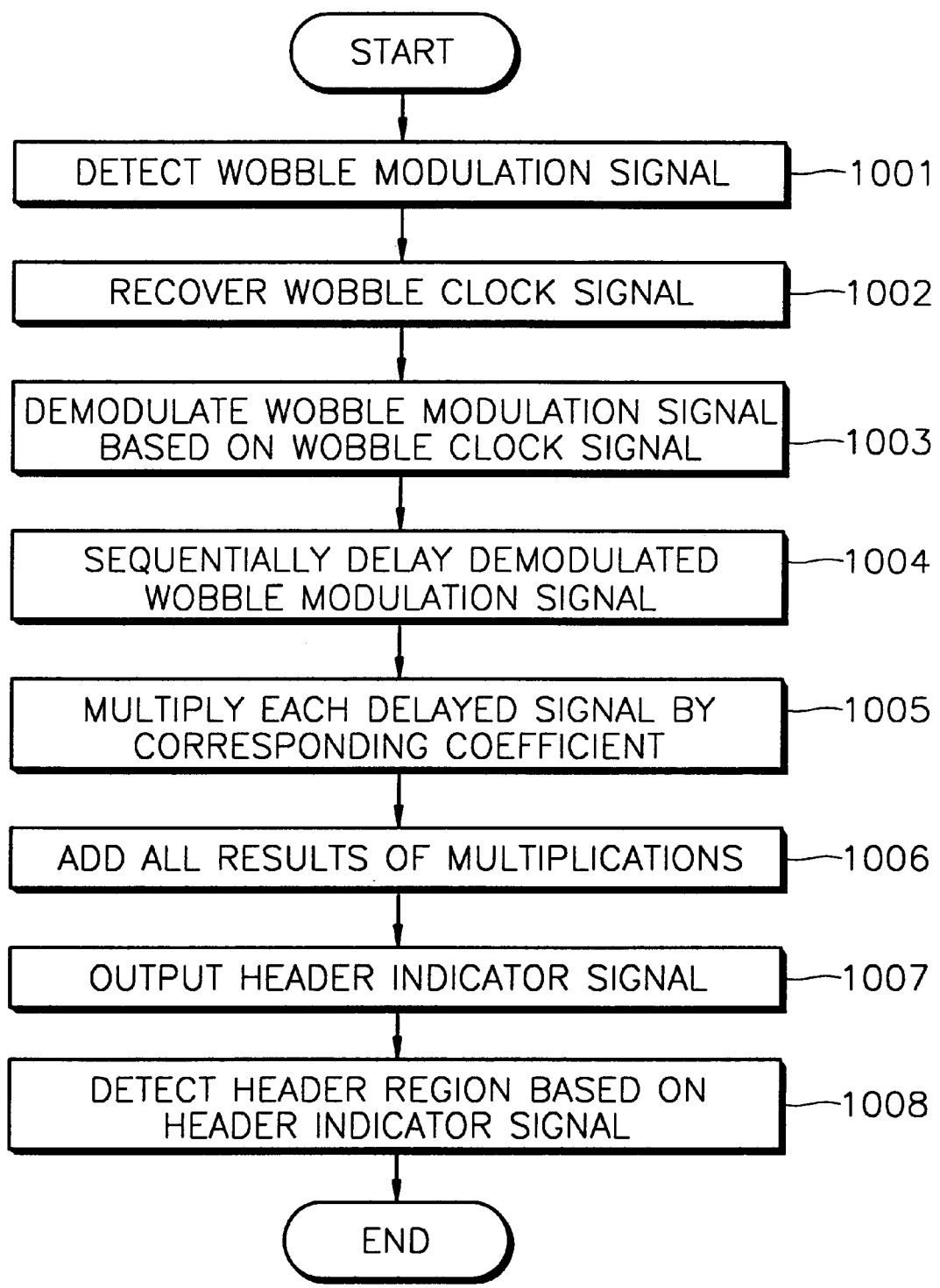
FIG. 10 is a detailed flowchart illustrating the method of FIG. 9.

FIG. 10 is a detailed flowchart illustrating the method of FIG. 9. Referring to FIG. 10, where it is assumed that a wobble modulation signal as binary data is a sequence of $P_1$, $P_2, P_3, \ldots, P_{L-1}$ and $P_L$, a pickup device (not shown) of a detection apparatus detects a wobble modulation signal from a wobble-modulated region on a recording medium at 1001.

The PLL module 61 receives the detected wobble modulation signal sequence of $P_1, P_2, P_3, \ldots, P_{L-1}$ and $P_L$ and recovers a wobble clock signal at 1002. The demodulator 62 demodulates the wobble modulation signal based on the recovered wobble clock signal at 1003.

The demodulated signal of the wobble sequence of $P_1, P_2, P_3, \ldots, P_{L-1}$ and $P_L$ is sequentially delayed by the delay units 71 at 1004. A delayed sequence output from each of the delay units 71 is multiplied by a corresponding coefficient by each of the multipliers 72 at 1005. The output values of the multipliers 73 are added by the adder 73 at 1006. A correlation signal output from the adder 73 passes through the header reader 74 which is a sort of level comparator and then is output as a header indicator signal at 1007. The detection apparatus detects a header region based on the header indicator signal at 1008.

As described above, the present invention provides a recording medium from which a header region is reliably detected, and a method of and an apparatus for detecting the header region. Accordingly, the reliability of header information read is increased, and the recording and reproduction of information is precisely performed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording medium comprising:
   a wobbled track on which a wobble signal is recorded;
   a header region on which header information is recorded; and
   a wobble-modulated track on which a wobble modulation signal obtained by modulating the wobble signal is recorded, the wobble-modulated track formed adjacent the header region, the wobble modulation signal having a higher autocorrelation value than the wobble signal.

2. The recording medium of claim 1, wherein the wobble modulation signal is the wobble signal after having been phase modulated.

3. The recording medium of claim 2, wherein the wobble modulation signal is binary data of a predetermined length after having been subjected to binary phase shift keying (BPSK).

4. The recording medium of claim 3, wherein the autocorrelation $R(\tau)$ of the wobble modulation signal has a maximum value where $\tau=0$.

5. The recording medium of claim 3, wherein the autocorrelation $R(\tau)$ of the wobble modulation signal is substantially 0 where $\tau \neq 0$.

6. The recording medium of claim 3, wherein the wobble modulation signal has a white noise characteristic.

7. The recording medium of claim 3, wherein the wobble modulation signal is a pseudo random (PR) sequence.

8. The recording medium of claim 7, wherein where the wobble modulation signal is processed by a finite impulse response (FIR) filter, where an equation describing filtering characteristics of the FIR filter has values of bits of the wobble modulation signal as coefficients, a frequency characteristic of the wobble modulation signal is substantially 0 in a DC area.

9. The recording medium of claim 1, wherein the wobbled track is divided into sectors and the header region is positioned at a boundary region between adjacent sectors.

10. The recording medium of claim 9, wherein the header region comprises a plurality of portions displaced from a center of the wobbled track.

11. The recording medium of claim 10, wherein half of the portions of the header region are disposed at one side of the center of the wobbled track and the other half of the portions of the header region are disposed at the other side of the center of the wobbled track.

12. The recording medium of claim 11, wherein the header information is recorded in the form of pre-pits, which are formed along the center of the wobbled track.

13. A method of detecting a header region from a recording medium including a wobbled track on which a wobble signal is recorded, a wobble-modulated region on which a wobble modulated signal is recorded and the header region on which header information is recorded, the method comprising:
   detecting the wobble modulation signal;
   demodulating the detected wobble modulation signal;
   auto-correlating the demodulated wobble modulation signal to output a header indicator signal based on the autocorrelation; and
   detecting the header region based on the header indicator signal.

14. The method of claim 13, further comprising detecting the header region at a boundary region between sectors, and detecting the wobble modulation signal from the wobble-modulated region formed between the wobbled track and the header region.

15. The method of claim 14, wherein the wobble modulation signal is the wobble signal after having been phase modulated.

16. The method of claim 15, wherein the wobble modulation signal is binary data of a predetermined length after having been subjected to binary phase shift keying (BPSK).

17. The method of claim 16, wherein the wobble modulation signal is a pseudo random (PR) signal.

18. The method of claim 17, wherein an autocorrelation ($R(\tau)$) of the wobble modulation signal has a maximum value where $\tau=0$.

19. The method of claim 17, wherein an autocorrelation ($R(\tau)$) of the wobble modulation signal is substantially 0 where $\tau \neq 0$.

20. The method of claim 13, wherein the auto-correlating comprises filtering the demodulated wobble signal with a finite impulse response (FIR) filter, wherein an equation describing filtering characteristics of the FIR filter has values of bits of the wobble modulation signal as coefficients and an amplitude response of the FIR filter is substantially 0 in a DC area.

21. The method of claim 13, further comprising generating a clock signal based on the wobble modulation signal, wherein the demodulating of the detected wobble modulation signal is based on the clock signal.

22. The method of claim 21, wherein the auto-correlating comprises:
   sequentially delaying binary data comprising the wobble modulation signal to obtain a plurality of node values;
   multiplying each node value by a corresponding bit of the binary data; and
   adding the multiplied node values.

23. An apparatus for detecting a header region from a recording medium including a wobbled track on which a wobble signal is recorded, a wobble modulated region on which a wobble modulation signal is recorded and the header region on which header information is recorded, the apparatus comprising:
   a clock signal generator which generates a clock signal based upon the wobble modulation signal;
   a demodulator which demodulates the wobble modulation signal based on the clock signal; and
   a correlator which performs an autocorrelation on the demodulated wobble modulation signal from the demodulator and outputs a header indicator signal based on the autocorrelation.

24. The apparatus of claim 23, wherein the apparatus detects the wobble-modulated region which is formed between the wobbled track and the header region.

25. The apparatus of claim 24, wherein the apparatus detects the header region positioned at a boundary region between sectors of the wobbled track.

26. The apparatus of claim 23, wherein the wobble modulation signal is the wobble signal after having been phase modulated.

27. The apparatus of claim 26, wherein the wobble modulation signal is binary data of a predetermined length after having been subjected to binary phase shift keying (BPSK).

28. The apparatus of claim 27, wherein the wobble modulation signal is a pseudo random (PR) signal.

29. The apparatus of claim 28, wherein the autocorrelation $R(\tau)$ of the wobble modulation signal has a maximum value where $\tau=0$.

30. The apparatus of claim 29, wherein the autocorrelation ($R(\tau)$) is substantially 0 where $\tau \neq 0$.

31. The apparatus of claim 23, wherein the correlator comprises:
   a finite impulse response (FIR) filter which:
      sequentially delays the wobble modulation signal to obtain a plurality of delayed signals,
      multiplies the respective delayed signals by corresponding bits of the wobble modulation signal, and
      adds the values of the multiplied delayed signals to obtain a correlation output; and
   a header reader which compares the correlation output from the FIR filter with a predetermined reference level and outputs the header indicator signal to detect the header region.

32. The apparatus of claim 31, wherein the FIR filter comprises:
   a delay unit which receives and sequentially delays the modulated wobble modulation signal to output the plurality of delayed signals,
   a multiplier which multiplies each delayed signal from the delay unit by a corresponding bit of the demodulated wobble modulation signal, and
   an adder which adds the outputs of the multiplier.

33. The apparatus of claim 32, wherein the frequency characteristic of the FIR filter with respect to the wobble modulation signal input thereto is substantially 0 in a DC area.

34. A method of detecting a header region from a recording medium having a wobble modulation signal and the header region recorded thereon, the method comprising:
   detecting the wobble modulation signal;
   phase locking the detected wobble modulation signal to output a clock signal;
   demodulating the wobble modulation signal based on the clock signal;
   delaying the demodulated wobble modulation signal to obtain a plurality of delayed signals;
   multiplying the respective delayed signals by corresponding bits of the demodulated wobble modulation signal;
   adding the multiplied delayed signals to output an added value;
   comparing the added value with a predetermined reference level to detect the header region.

35. An apparatus for detecting a header region from a wobble modulation signal detected from a recording medium having the wobble modulation signal and the header region recorded thereon, the apparatus comprising:
   a phase lock loop which locks onto the detected wobble modulation signal to output a clock signal;
   a demodulator which demodulates the detected wobble modulation signal based on the clock signal;
   a plurality of delays which delay the demodulated wobble modulation signal to output a plurality of delayed signals;
   a plurality of multipliers which multiply respective ones of the plurality of delayed signals by corresponding bits of the demodulated wobble modulation signal;
   an adder which adds the multiplied delayed signals to output an added value; and
   a header reader which compares the added value with a predetermined reference level to detect the header region.

36. The recording medium of claim 3, wherein the wobble modulation signal has bits of 1 and 0 and a number of the bits 1 is similar to a number of the bits 0.

* * * * *